US012578268B2

(12) United States Patent
Kalwa

(10) Patent No.: US 12,578,268 B2
(45) Date of Patent: *Mar. 17, 2026

(54) METHOD FOR DETERMINING ADHESIVE PENETRATION INTO AT LEAST ONE POROUS COATING MATERIAL

(71) Applicant: Flooring Technologies Ltd., Kalkara (MT)

(72) Inventor: Norbert Kalwa, Horn-Bad Meinberg (DE)

(73) Assignee: Flooring Technologies Ltd., Kalkara (MT)

( * ) Notice: Subject to any disclaimer, the term of this patent is extended or adjusted under 35 U.S.C. 154(b) by 191 days.

This patent is subject to a terminal disclaimer.

(21) Appl. No.: 18/287,366

(22) PCT Filed: Apr. 8, 2022

(86) PCT No.: PCT/EP2022/059463
§ 371 (c)(1),
(2) Date: Oct. 18, 2023

(87) PCT Pub. No.: WO2022/223324
PCT Pub. Date: Oct. 27, 2022

(65) Prior Publication Data
US 2024/0201080 A1      Jun. 20, 2024

(30) Foreign Application Priority Data
Apr. 19, 2021     (EP) ..................................... 21169141

(51) Int. Cl.
*G01N 21/3563* (2014.01)
*G01N 21/359* (2014.01)

(52) U.S. Cl.
CPC ....... *G01N 21/3563* (2013.01); *G01N 21/359* (2013.01); *G01N 2201/127* (2013.01)

(58) Field of Classification Search
CPC ............. G01N 21/3563; G01N 21/359; G01N 2201/127
See application file for complete search history.

(56) References Cited

U.S. PATENT DOCUMENTS

2004/0195714 A1* 10/2004 Mbachu ................ B05B 12/126
156/64
2016/0123871 A1* 5/2016 Kalwa ................ G01N 21/3563
250/340
2018/0080867 A1* 3/2018 Denk ................... G01N 21/359

FOREIGN PATENT DOCUMENTS

CN        105334179 A      2/2016
EP          3327424 A1     5/2018
WO       2007021235 A1     2/2007
WO       2015105456 A1     7/2015

* cited by examiner

*Primary Examiner* — Edwin C Gunberg
*Assistant Examiner* — Richard O Toohey
(74) *Attorney, Agent, or Firm* — The Webb Law Firm

(57) ABSTRACT

Provided is a method for determining the adhesive penetration into at least one porous coating material which is pressed with at least one carrier plate and at least one adhesive layer arranged on the carrier plate. The adhesive penetrates or rises into the at least one porous coating material during the pressing process.

20 Claims, 1 Drawing Sheet

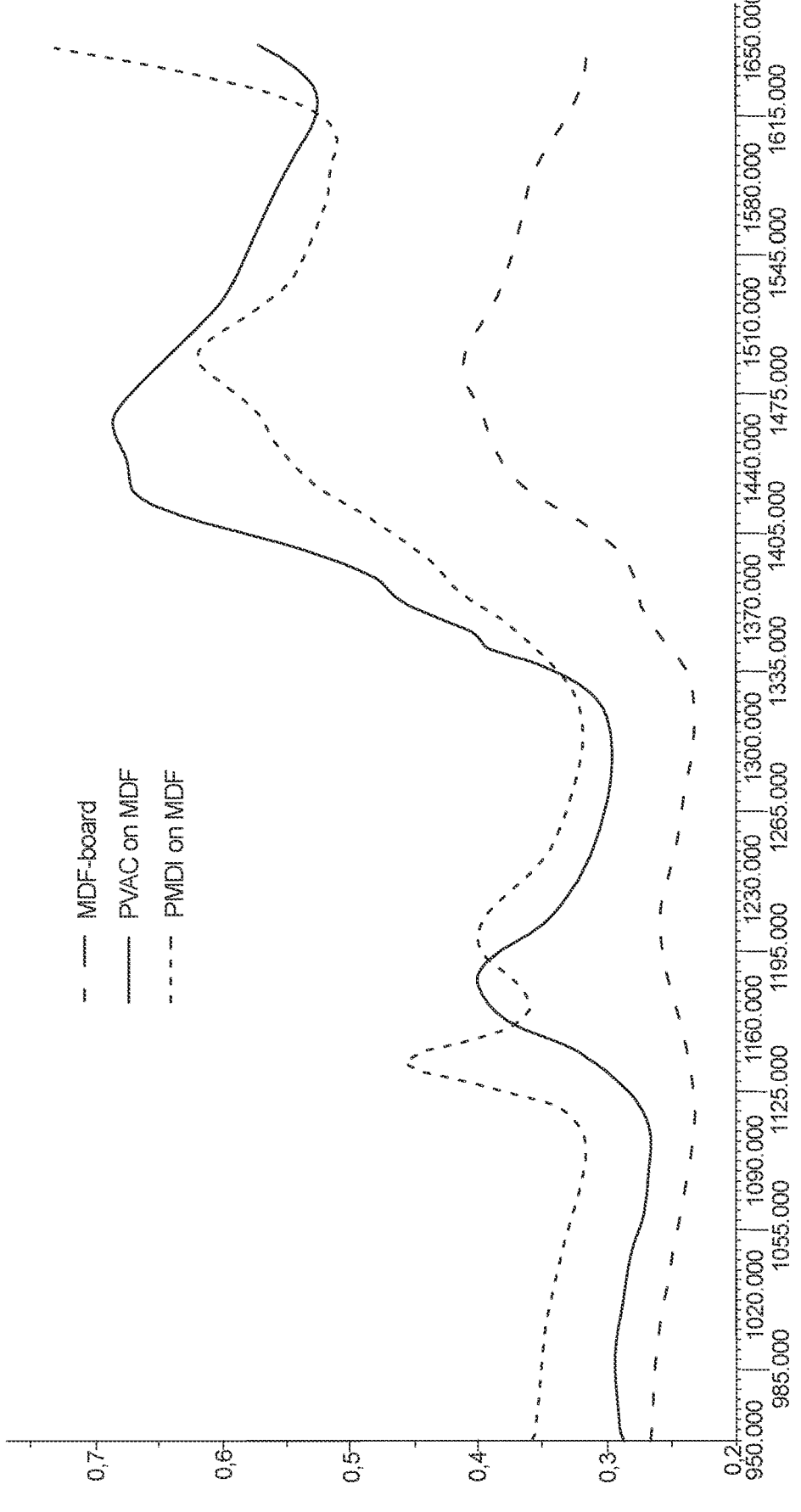

METHOD FOR DETERMINING ADHESIVE PENETRATION INTO AT LEAST ONE POROUS COATING MATERIAL

CROSS REFERENCE TO RELATED APPLICATIONS

This application is the United States national phase of International Patent Application No. PCT/EP2022/059463 filed Apr. 8, 2022, and claims priority to European Patent Application Number 21169141.5 filed Apr. 19, 2021, the disclosures of which are hereby incorporated by reference in their entireties.

BACKGROUND OF THE INVENTION

Field of the Invention

The proposed solution relates to a method for determining the adhesive penetration into at least one porous coating material, which is pressed with at least one carrier plate and at least one adhesive layer arranged on the carrier plate, wherein the adhesive penetrates or rises into the at least one porous coating material during the pressing process.

Description of Related Art

Floor coverings are increasingly being provided with various coating materials such as leather, felt or real wood to meet increased customer demands.

Various technologies are used in the production of flooring with a real wood surface. One approach is to glue relatively thick real wood veneers up to several millimeters thick onto transverse layers of wood. Layers of wood lying transversely to the middle layer are used as the support.

Another approach is to replace the wood layers with wood-based materials. In this case, a real wood veneer is glued onto a wood-based material substrate (HDF, particleboard, OSB, etc.). The veneers used here typically have a lower thickness, which results in lower mechanical strength than relatively thick veneers.

The advantage of using thin real wood veneers is cheaper production and material costs. However, the use of veneers requires a suitable surface finish. A possible surface finish here usually consists of a varnish based on UV or ESH varnishes.

Urea, PMDI or PVAc glues with hardener are usually used to bond the veneers to the substrate. On the reverse side of the product there is usually a veneer-based backing, which is intended to ensure the tension symmetry in the product. In addition, this also provides additional support for the aspect of a wooden floor.

One problem with this product is the limited possibility of repairing the product if it is damaged. This is all the more serious because the mechanical stability of the veneer layer is not particularly high due to the low bulk density of the veneer (300-500 kg/m³). In the event of mechanical damage caused by falling objects, for example, deep indentations are therefore quickly created in a product of this type.

A solution to this problem is provided by WO 2015/105456 A1, in which a mixture of wood flour and melamine resin powder is spread on a wood-based panel and then pressed onto the wood-based panel together with a veneer. Here, the greatest possible penetration of the melamine resin is desired, but direct control of the penetration level of the resin into the veneer is not possible.

The problems described above with regard to glued veneers are also essentially eliminated by a new technology. In this process, the veneer is pressed onto the wood-based substrate in a short-cycle press with the aid of a paper impregnated with melamine resin (e.g. an overlay). The pressing parameters are approx. T>150'C, p>30 bar and t>30 sec. This technology can also be used to produce veneer flooring with veneers that are approx. 0.5 mm thick. It is of decisive importance that the melamine resin rises as far as possible into the veneer during the pressing process. On the one hand, this reinforces the veneer with the synthetic resin and, on the other hand, fixes the veneer compressed by the pressing process in this state. However, the melamine resin should not escape from the veneer, as this would lead to discoloration of the surface and adhesion problems during subsequent varnishing or oiling.

One problem is that the quality of the reinforcement (i.e. the rising of the melamine resin into the veneer) cannot be determined non-destructively or on-line. This is all the more serious because, depending on the collection or utilization class, both different wood veneers and different veneer thicknesses are processed. In addition, veneers of the same wood species from different regions can also differ in terms of their properties.

This results in the following disadvantages: no non-destructive testing of the process possible; higher costs due to quality determination and readjustments to pressing parameters necessary.

SUMMARY OF THE INVENTION

The proposed solution is based on the technical task of developing a non-destructive method for determining the degree of adhesive penetration in porous coating materials such as veneers, nonwovens, leather and others. The method should provide results as quickly as possible so that there is as little or no downtime in production as possible due to the quality determination. Adhesive penetration should already be possible directly behind the press and allow continuous monitoring of this parameter.

This task is solved by a method with features as described herein.

Accordingly, there is provided a method for determining the adhesive penetration (or penetration height as degree of penetration or penetration amount of the adhesive) into at least one porous coating material, wherein the at least one porous coating material is pressed with at least one carrier plate and at least one adhesive layer disposed on the carrier plate, and wherein during the pressing process the adhesive penetrates or rises into the at least one porous coating material. The present method comprises the following steps:

Recording of at least one NIR spectrum of several reference samples, each having different values for adhesive penetration into a porous coating material, using at least one NIR measuring head in a wavelength range between 500 nm and 2500 nm, preferably between 700 nm and 2000 nm, in particular preferably between 900 nm and 1700 nm, and especially advantageously between 1000 nm and 1300 nm, even more advantageously between 1100 nm and 1250 nm and/or between 1400 nm and 1550 nm; the reference samples being identical to the sample to be measured;

Determining of adhesive penetration into the porous coating material of said reference samples by means of a mechanical ablation of the porous material surface;

Correlating the adhesive penetration determined by mechanical removal with the recorded NIR spectra of said reference samples; and Establishing a calibration model for the relationship between the spectral data of the NIR spectra and the corresponding adhesive penetrations of the reference samples using multivariate data analysis;

Pressing of at least one porous coating material with at least one carrier plate and at least one adhesive layer arranged on the carrier plate, Recording at least one NIR spectrum of the porous coating material pressed with the carrier plate and the adhesive layer using the at least one NIR measuring head in a wavelength range between 500 nm and 2500 nm, preferably between 700 nm and 2000 nm, in particular preferably between 900 nm and 1700 nm and particularly advantageously between 1000 nm and 1300 nm, even more advantageously between 1100 nm and 1250 nm and/or between 1400 nm and 1550 nm; and Determining the adhesive penetration into the at least one porous coating material by comparing the NIR spectrum recorded for the porous coating material with the calibration model created.

According to the present method, an NIR spectrum of the porous material surface is recorded. An NIR radiation is generated and directed onto the substrate sample to be analyzed with the material surface, where the NIR radiation interacts with the constituents of the sample and is reflected or scattered. An NIR detector captures the reflected or scattered NIR radiation and produces an NIR spectrum that contains the desired chemical information of the sample. In this measurement, a large number of individual NIR measurements are made in one second, so that statistical validation of the measured values is also ensured. The NIR spectroscopy together with the multivariate data analysis (mentioned below) offers a possibility to establish a direct relation between the spectral information (NIR spectra) and the parameters to be determined of the applied porous coating material, e.g. a veneer layer.

The present method takes advantage of the fact that the NIR radiation penetrates through the coating materials but not through the carrier plate, but is reflected or scattered at the surface of the carrier plate. The reflected or scattered NIR radiation is detected by the NIR detector and the determined NIR spectrum is used to determine the desired parameters (here penetration height of the adhesive into the coating material).

The recorded NIR spectrum, in combination with an analysis of the percentage of penetration via mechanical removal of the porous material surface, makes it possible to generate a correlation. Surprisingly, it has been shown that depending on how far the adhesive, e.g. polyurethane adhesive, rises into the porous coating material, a signal increase for the adhesive peak can be observed.

First of all, reference samples of a carrier plate pressed with a porous coating material and adhesive layer are provided. It is essential that the reference sample is similar to the sample to be measured; i.e. in particular the adhesive layer and porous coating material of the reference sample have the same composition as the adhesive layer and porous coating material to be measured. The similarity of the sample to be measured and the reference sample is particularly essential when using adhesive layers with additives such as flame retardants, fibers, further additives.

At least one NIR spectrum is recorded from these reference samples in a wavelength range between 500 nm and 2500 nm, preferably between 700 nm and 2000 nm, in particular preferably between 900 nm and 1700 nm.

These reference samples are also subjected to non-spectroscopic analysis to determine the desired parameters, i.e. in the present case of a mechanical removal of the porous material surface.

A mean value is formed from the parameters determined for the reference samples by means of the non-spectroscopic analysis, which is then assigned to the respective recorded NIR spectra of these reference samples, and a calibration model is created for the correlation between the spectral data of the NIR spectra of the reference samples and the associated parameter values by means of a multivariate data analysis; i.e. an NIR spectrum of the reference sample corresponds to each parameter value of the reference sample. The calibration models created for the various parameters are stored in a suitable data memory.

Subsequently, at least one porous coating material is pressed with adhesive layer and carrier plate and at least one NIR spectrum of the pressed porous coating material is recorded. The desired parameter of the porous coating material (here the adhesive penetration or penetration height into the porous coating material) can then be determined by comparing the NIR spectrum recorded for the pressed porous coating material with the calibration model created.

It is thus possible to simultaneously determine several parameters of interest of the porous coating material pressed with the carrier plate from a single NIR spectrum determined for the sample to be measured by an automated comparison or alignment with the calibration models created for the respective parameters.

A comparison and interpretation of the NIR spectra is carried out meaningful over the entire recorded spectral range. This is advantageously carried out with a multivariate data analysis (MDA) known per se. In multivariate analysis methods, several statistical variables are typically examined simultaneously in a manner known per se. For this purpose, these methods usually reduce the number of variables contained in a data set without simultaneously reducing the information contained therein.

In the present case, the multivariate data analysis is carried out using the partial least squares regression (PLS) method, which allows a suitable calibration model to be created. The evaluation of the obtained data is preferably performed with a suitable analysis software such as the analysis software SIMCA-P of the company Umetrics AB or The Unscrambler of the company CAMO.

In a further embodiment, spectral data from the NIR spectral range between 1000 nm and 1300 nm, preferably between 1100 and 1250 nm and/or between 1400 nm and 1550 nm, which are pretreated by means of suitable mathematical methods and then fed to the multivariate data analysis, are to be used to create the calibration model.

The importance of a wavelength for the prediction of parameters of the pressed porous coating material, such as the adhesive penetration, from the NIR spectrum is shown with the help of the regression coefficients. Here, the regions with large coefficient magnitudes have strong influence on the regression model. For example, the representation of the regression coefficients in a PLS regression model for the determination of the amount of adhesive shows that the wavelength range between 1000 nm and 1300 nm and/or between 1400 nm and 1550 nm is the most important for the calculation of the model, since the amounts of the regression coefficients are largest here. The other ranges in the spectrum have less information content in relation to the NIR measurement, but still help to take into account or minimize the other information or interfering influencing variables (such as transparency of the layer, surface properties of the adhesive layer or the substrate material, etc.).

To eliminate interfering influences (such as the nature of the surface of the substrate or porous coating material, color of the samples, light scattering from solid particles or other additives, etc.), it is necessary to process the spectral data using mathematical pretreatment methods (e.g. derivative data pretreatment, standardization according to SNVT (Standard Normal Variate Transformation), multiplicative signal correction (EMSC, Extended Multiplicative Signal Correction, etc.). In this process, baseline effects mainly caused by the different color of samples are removed from the spectra, overlapping bands are separated from each other, and the dependence of light scattering on the substrate surface is taken into account. Thus, data pretreatment is done preferentially to reduce light scattering from the rough surface of the substrate. During measurement, the focus of calibration and data pretreatment is on removing baseline shift.

From the pretreated data, multivariate data analysis is used to develop a calibration model that includes all the decors used in the calibration.

Accordingly, the comparison and interpretation of the NIR spectra are preferably performed in the spectral range between 1000 nm and 1300 nm and/or between 1400 nm and 1550 nm using multivariate data analysis MDA. In multivariate analysis methods, several statistical variables are typically examined simultaneously in a manner known per se. For this purpose, the number of variables contained in a data set is reduced without simultaneously reducing the information contained therein.

In the present method, series pressing was carried out to establish the correlation, in which an HDF (fiberboard with increased bulk density) was coated with different amounts of liquid and subsequently dried adhesive (such as PMDI and polyvinyl acetate glue). Then, a porous coating material, such as an oak veneer with a thickness of 0.5 mm, was placed and pressed on top of this HDF. NIR spectra were made of these samples. This showed that the adhesive peak was more or less pronounced, depending on the penetration. The penetration height of the adhesive into the porous material was then determined by mechanical removal of the porous material and related to the NIR spectra. In this process, the adhesive or the adhesive front can be colored for better visualization, but this does not interfere with the NIR spectroscopy.

The present method enables the provision of the measured values in a short time (online, preferably without disturbing time delay) compared to conventional (known) measuring methods. The measurement data can be used for quality assurance, research and development, process control, regulation, etc. The measurement process does not reduce the production speed, etc. Basically, it improves the monitoring of production. In addition, downtimes due to quality determinations and plant adjustments are also reduced.

The advantages of the present method are manifold: non-contact multi-parameter determination ("real time" or "real-time" measurement) with significantly reduced time delay in the evaluation of the measured parameter values; improved plant control or regulation, reduction of rejects, improvement of the quality of the products manufactured on the plant, improvement of plant availability.

In one embodiment of the present method, the at least one adhesive is a polyurethane adhesive. A polyurethane adhesive based on aromatic polyisocyanates, in particular poly-diphenylmethane diisocyanate (PMDI), tolylene diisocyanate (TDI) and/or diphenylmethane diisocyanate (MDI) is used, PMDI being particularly preferred. When used as a binder or adhesive, the isocyanate undergoes two chemical reactions. First, it forms polyurea in the presence of water. In parallel, bonding to the particles or surfaces to be bonded takes place through the reaction of the isocyanates with free hydroxyl or amino groups on the surface to form a urethane or urea bond.

The amount of polyurethane adhesive applied, e.g., a 100% PMDI adhesive system, is 50 to 150 g fl/m$^2$, preferably 70 to 120 g fl/m$^2$, more preferably 90 to 110 g fl/m$^2$, e.g., 100 g fl/m$^2$.

When a polyurethane adhesive, such as PMDI adhesive, is used, the NIR spectrum shows characteristic peaks in wavelength ranges between 1120 and 1250 nm with maxima at 1130-1150 nm and 1200-1220 nm, and between 1440 and 1540 nm.

In another embodiment, a polyvinyl ester adhesive, in particular a polyvinyl acetate (PVAc) adhesive, is used.

The amount of polyvinyl ester adhesive applied, e.g., a PVAc adhesive system with 50% solids by weight, is 100 to 300 g f/m$^2$, preferably 150 to 250 g f/m$^2$, more preferably 180 to 220 g f/m$^2$, e.g., 200 g f/m$^2$.

When using a polyvinyl ester adhesive such as a PVAc adhesive, characteristic peaks can be seen in the NIR spectrum in wavelength ranges between 1160 and 1220 nm with a maximum at 1180-1200 nm, and between 1420 and 1480 nm.

Additive

As mentioned above, according to the present method, at least one additive can be applied to—or incorporated into—the at least one adhesive layer.

In a preferred embodiment, at least one additive is applied to the (preferably tacky) surface of the adhesive layer. The additive can be applied in liquid or solid form, in particular as a particulate solid (dust, powder, granules), or as a liquid or paste, for example by spraying, spraying, casting, doctoring, rolling, spreading.

One additive or mixtures of several additives can be used, and several additives can also be applied in succession.

The additives used may be selected from the following group: Dyes (ink), pigments (e.g. color pigments, metallic pigments or reflective pigments) flame retardants (e.g. ammonium polyphosphate, tris(tri-bromine neopentyl) phosphate, zinc borate or boric acid complexes of polyhydric alcohols), agents to increase conductivity, UV stabilizers, bleaching agents, hydrophobing agents or antimicrobial agents.

Possible antimicrobial active substances may include at least one biocide. A prerequisite for the selection of a suitable biocide is that it complies with EU Regulation No. 528/2012 concerning the placing of biocidal products on the market. Biocides can be classified either according to product types such as disinfectants and protectants or according to their target organisms (virucides, bactericides, fungicides, etc.). Presently, the at least one biocide may be selected from a group comprising benzalkonium chloride, octylammonium chloride, chitosan, phenylphenol, copper sulfate, silver nitrate, lactic acid, nonanoic acid, sodium benzoate, 1-[[2-(2,4-dichlorophenyl)-4-propyl-1,3-dioxolan-2-yl]methyl]-1H-1,2,4-triazoles, 2-octyl-2H-isothiazol-3-ones, thiazol-4-yl-1H-benzoimidazoles, 3-iodo-2-propynylbutylcarbamate, biphenyl-2-ol, bronopol/calcium magnesium oxide, copper (II) oxide, 2-pyridinethiol-1-oxide, silver oxide, silver-copper zeolite. The active ingredients listed are from product families 2 and 9, which have already been approved or are in the process of being approved for antiviral floors.

Preferably, the additive is not soluble or not homogeneously soluble in the adhesive provided on the surface. This ensures that the additive does not mix with the adhesive but remains on the surface and can thus come into contact with and penetrate the porous coating material.

Carrier Plate

In one embodiment of the present method, the at least one carrier board is a board made of a wood-based material, in particular a particleboard, medium-density fiberboard (MDF), high-density fiberboard (HDF), oriented strand board (OSB) or plywood board, made of plastic, a wood-based material-plastic mixture or a composite material, a cement fiberboard, gypsum fiberboard or a WPC board (wood plastic composites) or an SPC board (stone plastic composites).

The surface of the carrier material can be surface-treated. Also, the surface of a wood-based substrate board may be sanded (without press skin) or non-sanded (with press skin). In the case of a plastic carrier board, the surface may be corona treated.

Porous Coating Material

The at least one porous coating material may be selected from the following materials: a veneer layer, a leather material, a paper material such as cardboard, felt material, nonwoven material, and other fabric materials. In particular, materials are included which have a porosity in which liquid adhesive can rise during pressing and which are at least partially plastically deformable.

In the case of using a veneer layer, in one embodiment, the veneer layer comprises at least one layer of real wood veneer.

In a more advanced embodiment, the at least one veneer comprises at least one real wood ply having a thickness between 0.2-10 mm, preferably 0.5-5 mm, more preferably 0.5-2 mm. The veneer may be made in one piece from a log, for example by peeling. However, it may also be composed of individual pieces joined together, for example, by binders or so-called glue threads. The veneer preferably has the dimensions of the carrier board. The veneer has a lower side facing the carrier board and an upper side facing away from the carrier board.

In case of using leather material, e.g. as insulating layer, preferably leather fiber material with thickness between 0.5 mm and 1 mm, preferably 0.75 mm is used.

Leather material or leather fiber material is defined here as a material made from shavings, e.g. chrome shavings and shredded, vegetable-tanned leather residues from the leather processing industry, binders, e.g. natural latex and natural fats. The proportion of leather in a leather fiber fabric is at least 50%. The processed leather residues can, among other things, come from cattle or other animals, such as horses. However, natural leathers of various thicknesses can also be used.

In a more advanced embodiment of the present method, the at least one backing sheet, the at least one adhesive layer disposed on the backing sheet, and the at least one porous coating material are compressed at temperatures between 150 and 200° C., preferably between 170 and 180° C. at a pressure of 30 to 50 kg/cm², preferably 40 kg/cm² for 30-120 seconds, preferably 60 to 90 seconds.

The present method thus enables the determination of the degree of penetration of adhesive into a porous coating material pressed with a carrier board with the following layer structure: wood-based panel—adhesive system—additives, if any—porous coating material.

In one variant, the NIR measurement of the penetration height of the adhesive into the porous coating material can be determined continuously within, i.e. online, the production line of the material sheets. In this online variant, the penetration height is thus determined during the ongoing production process. This enables direct control and intervention in the production process.

In a second embodiment of the present method, the penetration height can also be determined outside (i.e. offline) the production line of the material sheets. In this variant, a finished pressed material plate is removed or discharged from the production line and measured offline, e.g. in a separate laboratory, as part of routine quality control.

In another variant, the NIR measurement can be performed both online and offline.

It can also be provided that the at least one NIR measuring head moves transversely to the direction of travel of the carrier plates pressed with the porous coating material. The NIR detector can be installed at any point in the transport direction of the plate. The detector can also traverse the width of the plate or analyze specific problem areas (e.g. in the edge or center area of the plates, etc.). In addition, the measured values are immediately available and allow immediate intervention in the process. This is not readily possible with other methods.

The present method is carried out in a production line comprising at least one NIR multimeter head, preferably at least two NIR multimeter heads, and at least one control system. Such a production line may be a production line for manufacturing material boards. Preferably, the present method for determining adhesive penetration into the porous coating material is performed continuously and online.

The control system of the production line comprises at least one computer-aided evaluation unit (or processor unit) and a database. In the evaluation unit, the NIR spectrum measured for the product (i.e. pressed porous coating material) is matched or compared with the calibration models created for the respective individual parameters. The parameter data determined in this way are stored in the database.

The data determined with the present spectroscopic method can be used to control the production line. The non-contact measured parameter values of the NIR multimeter head ("actual values") can be used directly and in "real time" for the control or regulation of the relevant plant, as described before, for example by storing the actual values measured and stored in the database, e.g. a relational database, and comparing them with target values of these parameters existing there. The resulting differences are then used to control or regulate the production line.

A computer-implemented method and a computer program comprising instructions which, when the program is executed by a computer, cause the computer to execute the computer-implemented method are provided for balancing and controlling the production line. The computer program is stored in a memory unit of the production line control system.

BRIEF DESCRIPTION OF THE DRAWINGS

The solution is explained in more detail below with reference to the FIGURES in the drawings using an example of an embodiment.

FIG. 1 shows NIR spectra of an MDF panel, an MDF panel coated with a polyurethane adhesive (PMDI) and an MDF panel coated with a polyvinyl acetate adhesive.

DESCRIPTION OF THE INVENTION

FIG. 1 shows NIR spectra of an MDF panel without adhesive, an MDF panel provided with a polyurethane adhesive (PMDI) and an MDF panel provided with a polyvinyl acetate adhesive.

In the case of the PMDI adhesive, the NIR spectrum shows characteristic peaks in wavelength ranges between 1120 and 1250 nm with maxima at 1130-1150 nm and 1200-1220 nm, and between 1440 and 1540 nm.

In the case of the PVAc adhesive, the NIR spectrum shows characteristic peaks in wavelength ranges between 1160 and 1220 nm with a maximum at 1180-1200 nm, and between 1420 and 1480 nm.

Example 1

On two 8 mm HDF (500×500 mm), black colored PMDI (100% system) was applied on one side in quantities of 50 and 100 fl g/m². This was done with a roller application unit.

An oak veneer (thickness: 0.5 mm) was then laid on top of the HDFs. Then the structure was pressed in a laboratory press at 180° C., a pressure of 40 kg/cm² and a pressing time of 160 seconds. The veneer was thus compressed to a thickness of 0.35 mm.

Afterwards, specimens were cut from the plates (100×100 mm, four pieces each). After cooling, the surface was measured with an NIR measuring head at four points, which were marked by a coordinate cross and at which the abrasion/removal by the Taber abraser would later take place. In addition, a zero sample was also measured in which the oak veneer was fixed to the HDF with the aid of an adhesive device.

The specimens were then tested on a Taber abraser. The test was carried out in accordance with DIN EN 13329. The friction wheels of the taber-abraser were covered with the usual abrasive papers and also loaded with the usual weights. Then, after 200 revolutions in each case, it was visually checked whether black discoloration could already be observed in the veneer. Then, using a dial gauge in the circular recess created by the sandpaper in the four segments of the circle formed by a coordinate cross, the removal in mm was determined and the average value was formed from this. From this mean value, together with the four other samples, an overall mean value was formed. The removal was then subtracted from the veneer thickness, which was determined with the aid of a microscope, and then correlated with the spectra.

The values obtained are summarized in Table 1 below. It can be seen that at higher amounts (100 g/m²) of applied PMDI adhesive, the mechanical degradation in Taber-Abraser test is lower than at 50 g/m² of PMDI adhesive. This proves that the more PMDI adhesive is applied, the more PMDI adhesive penetrates into the veneer ply and the less has to be removed in the Taber-Abraser test to observe the black discolorations in the veneer ply.

The mechanical reduction in the Taber-Abraser test corresponds to the reduction determined by the NIR method, so that the NIR method allows verification of the penetration level of the adhesive in the veneer layer.

TABLE 1

| Amount of PMDI adhesive applied | Decrease in mm NIR | Decrease in mm Taber Abraser | Difference in mm |
|---|---|---|---|
| Zero sample | 0.26 | 0.29 | 0.03 |
| 50 g PMDI fl/m² | 0.11 | 0.14 | 0.03 |
| 100 g PMD fl/m² | 0.06 | 0.06 | 0 |

The measuring head for determining adhesive penetration is installed directly behind the press used. An automated displacement option allows the measuring head to analyze different areas of a panel coated with veneer or it can traverse over the panel. This ensures that areas that can usually be problematic due to different pressing conditions (e.g. panel edges) are also analyzed.

If the penetration of the adhesive into the veneer is not adequate, an improved adhesive flow can be achieved by changing the pressing temperature and/or the pressing time. The two parameters are changed in opposite directions. If the pressing temperature is reduced, the pressing time is extended. For example, if the pressing temperature is reduced by 10'C, the pressing time is extended by 10 to 20 seconds.

Example 2

To check the accuracy of the calibration, a coating with a leather was carried out instead of a coating of a HWS with a veneer. First, a spectrum of the leather used was created with the aid of an NIR measuring instrument to check whether the PMDI peak at approx. 1500 nm was superimposed by peaks of the leather. This was not confirmed.

A PMDI coating of 100 g f/m² (solids content 100%) was applied to one side of an 8 mm HDF (500×500 mm).

A brown leather (thickness: 0.75 mm) was then placed on the PMDI. The structure was then compressed in a laboratory press at 180° C., a pressure of 40 kg/cm² and a pressing time of 160 seconds. This compressed the leather to a thickness of 0.45 mm.

Samples were then cut from the plate (100×100 mm, four pieces each). After cooling, the surface was measured with an NIR measuring head at four points marked by a coordinate cross.

The measurement with the NIR gauge showed a penetration depth of 0.35 mm. This was subsequently checked with the Taber abraser. A value of 0.35 was determined.

Other porous coating materials such as fabric, felt, fleece, etc. can also be measured using this method.

The invention claimed is:

1. A method for determining the adhesive penetration into at least one porous coating material which is pressed with at least one carrier plate and at least one adhesive layer, wherein the at least one adhesive layer is arranged on the carrier plate and the at least one porous coating material is arranged on the at least one adhesive layer, wherein the adhesive penetrates or rises into the at least one porous coating material during the pressing process, comprising the steps of:

recording at least one NIR spectrum of several reference samples, each having different values for adhesive penetration into a porous coating material, using at least one NIR measuring head in a wavelength range between 500 nm and 2500 nm;

determining adhesive penetration into the porous coating material of said reference samples by means of a mechanical removal of the porous material surface;

correlating the adhesive penetration determined by mechanical removal with the recorded NIR spectra of said reference samples;

establishing a calibration model for the relationship between the spectral data of the NIR spectra and the corresponding adhesive penetrations of the reference samples using multivariate data analysis;

pressing at least one porous coating material with at least one carrier plate and at least one adhesive layer arranged on the carrier plate, recording at least one NIR spectrum of the porous coating material pressed with the carrier plate and the at least one adhesive layer using the at least one NIR measuring head in a wavelength range between 500 nm and 2500 nm; and determining the adhesive penetration into the at least one porous coating material by comparing the NIR spectrum recorded for the porous coating material with the calibration model created.

2. The method according to claim 1, wherein the NIR spectrum is recorded in a wavelength range between 1100 and 1250 nm and 1400 and 1550 nm.

3. The method according to claim 1, wherein the at least one adhesive is a polyurethane adhesive.

4. The method according to claim 3, wherein the polyurethane adhesive is based on aromatic polyisocyanates.

5. The method according to claim 1, wherein the adhesive is a polyvinyl ester adhesive.

6. The method according to claim 1, wherein at least one additive is applied to the at least one adhesive layer.

7. The method according to claim 6, wherein the at least one additive is selected from the following group comprising dyes (e.g. ink), pigments (e.g. color pigments, metallic pigments or reflective pigments) flame retardants (e.g. ammonium polyphosphate, tris(tri-bromo neopentyl) phosphate, zinc borate or boric acid complexes of polyhydric alcohols), agents for increasing conductivity, UV stabilizers, bleaching agents, hydrophobing agents or antimicrobial agents.

8. The method according to claim 6, wherein the at least one additive is a dye.

9. The method according to claim 1, wherein the at least one carrier plate is a plate made of a wood material, made of plastic, a wood material-plastic mixture or a composite material, a cement fiberboard, gypsum fiberboard or a WPC board (Wood Plastic Composites) or an SPC board (Stone Plastic Composites).

10. The method according to claim 1, wherein the at least one porous coating material comprises at least one veneer layer, leather material, felt material, nonwoven material and/or such materials which have a porosity in which liquid adhesive can rise during pressing and which are at least partially plastically deformable.

11. The method according to claim 1, wherein the at least one carrier plate, the at least one adhesive layer disposed on the carrier plate, and the at least one porous coating material are compressed at temperatures between 15° and 200° C., at a pressure of 30 to 50 kg/cm², for 30-120 seconds.

12. The method according to claim 1, wherein spectral data from the entire recorded spectral range are used to create the calibration model.

13. The method according to claim 1, wherein spectral data from the NIR spectral range between 1000 nm and 1300 nm and/or between 1400 nm and 1550 nm, which are pretreated by means of suitable mathematical methods and are subsequently fed to the multivariate data analysis, are used to create the calibration model.

14. The method according to claim 1, wherein the determination of the adhesive penetration into the porous coating material is performed continuously and online.

15. The method according to claim 1, wherein the wavelength range is between 700 nm and 2000 nm.

16. The method according to claim 1, wherein the wavelength range is preferably between 900 nm and 1700 nm.

17. The method according to claim 4, wherein the aromatic polyisocyanate comprises polydiphenylmethane diisocyanate (PMDI), toluylene diisocyanate (TDI) and/or diphenylmethane diisocyanate (MDI).

18. The method according to claim 5, wherein the polyvinyl ester adhesive is a polyvinyl acetate adhesive.

19. The method according to claim 9, wherein the wood material is a particleboard, medium-density fiberboard (MDF), high-density fiberboard (HDF), oriented strand board (OSB), or plywood board.

20. The method according to claim 1, wherein the at least one carrier plate, the at least one adhesive layer disposed on the carrier plate, and the at least one porous coating material are compressed at temperatures between 17° and 180° C., at a pressure of 40 kg/cm², for 60 to 90 seconds.

* * * * *